Dec. 23, 1958     R. S. LONGACRE     2,865,137

SELF-WATERING CAPILLARY FLOWER POT

Filed Aug. 2, 1957

INVENTOR.
RUSSELL S. LONGACRE
BY
ATTORNEY

2,865,137
SELF-WATERING CAPILLARY FLOWER POT

Russell S. Longacre, York, Pa.

Application August 2, 1957, Serial No. 675,979

4 Claims. (Cl. 47—38)

This invention relates to improvements in a self-watering flower pot and, more particularly, to a self-watering flower pot in which capillary means are used to furnish a controlled amount of moisture from a water reservoir receptacle to soil-like material and plants or seeds in a flower pot supported preferably above the reservoir receptacle.

In the raising or growing of plants in flower pots, it is found that plants flourish best when furnished a definite amount of moisture, preferably continuously. At present, it is common practice to apply water to the top of a flower pot daily or sometimes a number of times each day. This type of watering affords uneven supplies of water to the seeds or plants growing within the pot however. In an effort to overcome this, it is also common practice to place a conventional flower pot within a suitable saucer or other shallow receptacle and place water in the latter so that the same might be drawn through the conventional hole in the bottom of a flower pot and thus moisten the soil of the pot somewhat by capillary action. Unless suitable spacing is provided between the bottom of the pot and the saucer and unless the saucer is of reasonable depth, this means of moistening the contents of a flower pot is not very effective. Further, the moisture content of the soil can not be controlled.

It is particularly desirable that certain types of plants such as African Violets, be maintained out of contact with water when water is being applied to a pot in which the plants are growing. Further, most plants do not flourish well when the soil is too moist or drowned. Too much moisture frequently produces a so-called sour soil and most plants do not grow well in this type of soil condition.

It is the principal object of the present invention to provide a simple and effective flower pot and water receptacle unit which functions to furnish a steady supply of moisture to the soil-like contents of the flower pot and plants or seeds growing therein, but the rate of feeding of the water from the reservoir receptacle to the contents of the flower pot may be controlled and regulated by relatively inexpensive means included within the unit.

Another object of the invention is to arrange the flower pot and reservoir receptacle so that they are attractive in contour and general appearance, the various components of the unit lending themselves to being formed inexpensively by molding from synthetic resin materials of a wide range of color combinations or single colors, such molding of the components not only minimizing the cost of producing the same but also insuring precise dimensions particularly on the interfitting portions of the components.

A further object of the invention is to provide simple and effective means for supplying moisture from the reservoir receptacle, by capillary action, and at a controlled, desired rate, to the soil-like material within the flower pot, the means for controlling the supply of moisture to the flower pot by capillary action also being of a type which may be molded, for example, inexpensively from synthetic resin, whereby the entire unit is free from corrosion and rust inasmuch as no metallic parts need be used in the unit unless desired.

Still another object of the invention is to utilize simple and effective cam means for varying or holding a desired given rate of supply of moisture to the contents of the flower pot, the cam means preferably being actuated simply by effecting relative rotation of the flower pot and reservoir receptacle about the vertical axes thereof, said cam means preferably being molded upon the members incident to the initial molding thereof and thus minimizing the cost of production.

Details of the foregoing objects and of the invention, as well as other objects thereof, are set forth in the following specification and are illustrated in the drawing comprising a part thereof.

Figure 1:
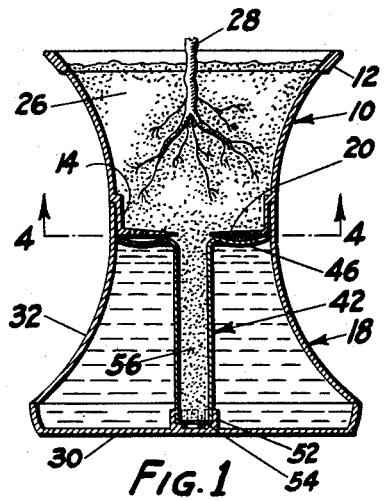
Fig. 1 is an exemplary vertical sectional view of one embodiment of flower pot unit incorporating the principles of the present invention.

Referring to the drawing and particularly Fig. 1, it is to be understood that the specific shape of the elements shown therein is exemplary only and the principles of the invention may be applied to other shapes and forms of said members without departing from the spirit of the invention.

However, the shapes of the various members of the flower pot unit illustrated in Fig. 1 are highly desirable for effective use of the flower pot unit and are attractive in appearance.

In accordance with the principles of the present invention, the flower pot unit illustrated in Fig. 1 comprises a flower pot 10 which preferably is circular in cross-section and may be formed inexpensively by molding from synthetic resin. However, said flower pot also may be formed from glass or metal, or any other suitable material, if desired. It is preferred however that the material not be toxic to the growth of plants to be contained within the flower pot. If desired, the flower pot 10 may be provided with a reinforced upper rim 12 in order to strengthen the same and minimize damage in the event the flower pot is accidentally knocked from its normal position. The lower portion of the flower pot is provided with a laterally inset, preferably cylindrical portion 14 which is complementary to the upper end 16 of reservoir receptacle 18. Further, the bottom 20 of the flower pot is integral with the lower end of cylindrical portion 14 and preferably is progressively thinner toward the center adjacent a preferably central aperture 22. The diameter of the central aperture 22 is somewhat critical as will be described in detail hereinafter. If desired, a plurality of additional, smaller holes 24 may be formed in the bottom 20 of the flower pot, particularly for purposes of preventing a vacuum from occurring in the reservoir receptacle 18.

If desired, prior to placing soil-like material 26 within the flower pot 10, suitable material such as rock wool or the like may be disposed in limited quantity immediately adjacent the bottom 20 of the flower pot, the same also preventing clogging of the holes 24. It is also to be understood that the term soil-like material is used generically, particularly in the event so-called chemical growing of plants or vegetables may take place within the unit and wherein the necessary chemicals to sustain the life of plants is provided in the reservoir receptacle 18 for feeding to the roots of the exemplary plant 28 shown in Fig. 1. Under such circumstances, it is not necessary that actual soil be placed within the flower pot 10 but merely suitable filling material such as inert rock wool, sand, or any other suitable substance.

The reservoir receptacle 18 may be provided in any desired shape but the exemplary receptacle illustrated in Fig. 1 has the advantage of being attractive and also of affording a broad base 30 which, for convenience, should be molded separately from the upper portion 32 of the receptacle 18 and connected to the base 30 by cementing or any other suitable means. The reservoir receptacle 18 is water-tight and the rim of the upper end 16 thereof is provided with a plurality of interconnected cam surfaces 34 which are complementary to similar cam surfaces 36 on the cylindrical portion 14 of flower pot 10. It will be seen particularly by reference to Figs. 2 and 3 that, when the flower pot 10 is moved by rotation about its vertical axis relative to the reservoir receptacle 18, the cams 34 and 36 will effect relative axial movement between the flower pot and reservoir receptacle, in opposite directions, depending upon the direction of rotation.

Figure 2:
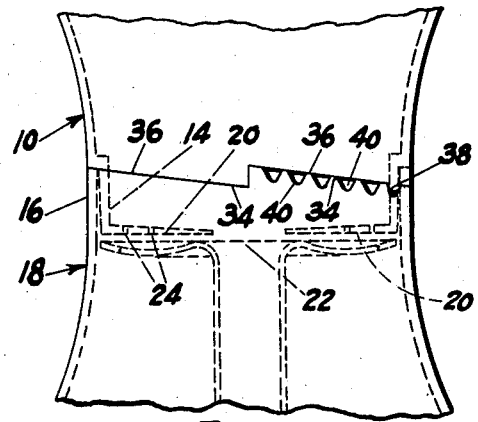
Fig. 2 is an enlarged, fragmentary vertical section illustrating particularly the nested portions of the flower pot and reservoir receptacle upon which the cam means for adjusting the flow of moisture to the flower pot are disposed. The relative positions of the members illustrated in this figure comprise those in which maximum feed of water from the reservoir to the flower pot is effected.
Figure 4:
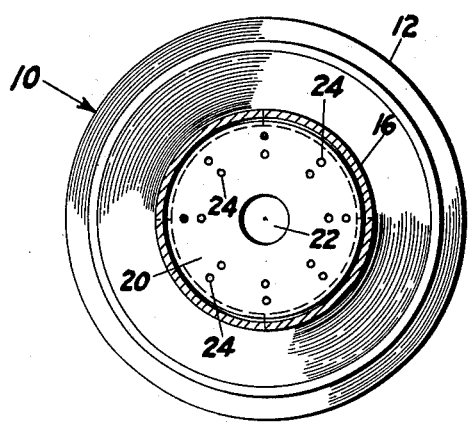
Fig. 4 is a bottom plan view of the flower pot and a sectioned portion of the reservoir receptacle, as viewed on the line 4—4 of Fig. 1, this figure being on a slightly larger scale than Fig. 1.
Figure 3:
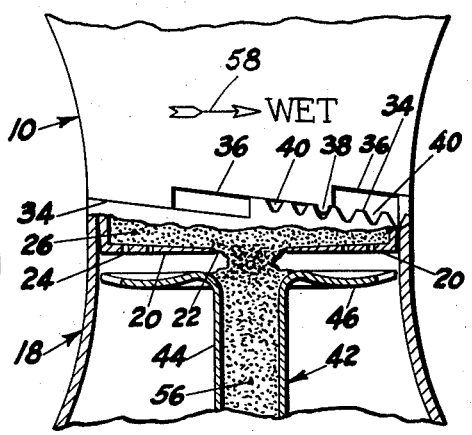
Fig. 3 is a view similar to Fig. 2 but illustrating a different position of the flower pot relative to the reservoir receptacle and in which a more limited supply of water from the reservoir to the flower pot is furnished.

For purposes of positively maintaining any relative desired position of adjustment between the flower pot 10 and reservoir receptacle 18, notwithstanding the fact that the inherent frictional qualities of the material from which the same are formed may be adequate to maintain desired adjustment, the present invention contemplates the use of interengageable positioning means. The exemplary, specifically illustrated form of such positioning means is best shown in Figs. 2 and 3 and comprises a protuberance 38 which, for example, extends downwardly from one of the cam surfaces 36 of the flower pot 10, adjacent the lower end of such cam surface. Said protuberance is arranged to engage selectively one of a series of recesses 40. The contour of the protuberance 38 and recesses 40 preferably is complementary and somewhat rounded so as to not unduly resist relative rotation of the flower pot and reservoir receptacle when rotation is desired. It will be seen however that the co-engagement of the protuberance with one of the recesses will be adequate to prevent especially rotation of the flower pot 10 in a direction to effect downward movement thereof until the flower pot is manually moved in such direction.

The flower pot unit of the present invention also includes a capillary member 42, one embodiment of which is illustrated in Figs. 1 through 6. Said member preferably comprises an impervious cylindrical stem 44 which terminates at its upper end in a somewhat dished, radial flange 46. The lower end of the capillary member has a bottom 48 containing a plurality of perforations 50. The capillary member 42 may be formed, for example, by molding from synthetic resin. However, if desired, suitable ceramic material or metal may be used, one type of metal being aluminum so as not to be toxic to the growth of plants.

The lower end of the capillary member 42 is provided with supporting means 52 which also position the capillary member 42 relative to the reservoir receptacle 18. The supporting and positioning means 52 may simply comprise a plurality of circumferentially spaced projecting prongs having lateral seats 54, see Fig. 1, against which the bottom 48 of the capillary member 42 abuts. Preferably, the engagement between the vertical inner faces of the supporting means 52 and the exterior of cylindrical stem 44 is frictional. It will be seen particularly from Fig. 1 that there is ample space between the bottom 30 of reservoir receptacle 18 and the bottom 48 of the capillary member 42 to permit water within the receptacle 18 readily to be supplied to the perforations 50. Hence, suitable material 56, preferably of a granular nature such as soil, sand or the like, will become permeated by capillary action with water from receptacle 18. Rock wool and similar material also may be used.

The upper end of the capillary member 42 terminates closely adjacent the bottom 20 of flower pot 10 and preferably coaxially with the central aperture 22 in the bottom of the flower pot. Hence, when the flower pot 10 and reservoir receptacle 18 are in the relative position illustrated in Fig. 2, the material 56 within the capillary member 42 is preferably in full engagement with the soil-like material 26 within the flower pot 10 and somewhat projecting through the central aperture 22 in the bottom thereof. Accordingly, by further capillary action, the moisture from the material 56 readily is transferred to the soil-like material 26 within the flower pot 10 so as adequately to moisten the same.

When less moisture is desired within the flower pot 10 than is afforded by the relative position of the members of the unit illustrated in Fig. 2, it is only necessary to rotate the pot 10 opposite to the direction of the indicating arrow 58, about the vertical axis of the flower pot in receptacle 18, whereupon the co-engaging cams 34 and 36 respectively on the pot and receptacle will effect vertical axial movement of the flower pot 10, thereby separating the central aperture 24 in the bottom thereof from the material in the upper portion of capillary member 42, resulting in a reduction in the capillary action between the capillary member and flower pot and hence reducing the flow of moisture to the interior of pot 10. The positioning means comprising protuberance 38 will be received within one of the recesses 40 when such adjustment has been completed and thereby serve to maintain said adjustment until further adjustment may be desired.

Should it be found that insufficient moisture is present within flower pot 10, the same may be rotated in the direction of the arrow 58 in order to bring the material 56 within the capillary member 42 into closer contact with the soil-like material 26 within the central aperture 22 of the pot 10, thereby effecting greater capillary action between the two bodies of material, with a result that more moisture will be fed to the material 26 within the flower pot.

The radial flange 46 is useful particularly when filling the cylindrical stem 44 of the capillary member with the material 56. Further, in the event any moisture drips from the holes 24 in the bottom of the flower pot 10, as might occur if the moisture content of the flower pot 10 is too great, said moisture will drop upon the flange 46 and fall into the reservoir 18 through the notches 60 therein, for example, said notches also facilitating the removal of the capillary member 42 from the receptacle 18 when desired, rather than to capillary member 42.

Figures 5, 6, 7, 8:
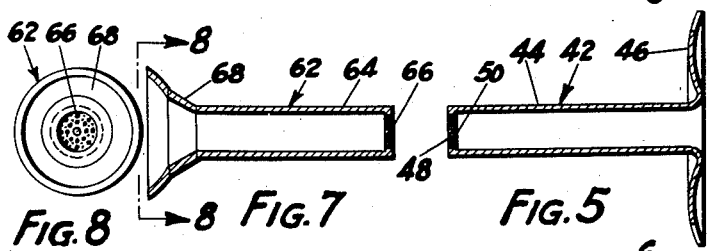
Fig. 5 is a longitudinal sectional view of the embodiment of capillary member illustrated in Fig. 1 but shown on a larger scale than in Fig. 1.
Fig. 6 is a top plan view of the embodiment of capillary member illustrated in Fig. 5 as seen from the line 6—6 of Fig. 5.
Fig. 7 is a longitudinal sectional view of another embodiment of capillary member which may be used in lieu of the form shown in Figs. 5 and 6, this figure being on a comparable scale to that used in Fig. 5.
Fig. 8 is a top plan view of the embodiment of capillary member shown in Fig. 7 as seen from the line 8—8 of Fig. 7.

In Figs. 7 and 8, a slightly different form of capillary member 62 is shown, the same having a cylindrical stem 64, a perforated bottom 66 and a more angularly flared end 68 than in the embodiment shown in Figs. 1 through 6. The flared upper end 68 is more funnel-shaped and possibly even more greatly facilitates the filling of the cylindrical stem 64 with material 56 than is afforded by flange 46 of the capillary member 42. Otherwise, the capillary member 62 functions similarly to the capillary member 42 relative to both the flower pot 10 and reservoir receptacle 18.

It will be seen from the foregoing that the several embodiments of the present invention provide capillary means for supplying moisture such as water to growing plants and seeds within a flower pot 10, while a substantial reservoir of water is maintained within a receptacle which preferably supports the flower pot. When it is desired to change the rate of flow from the reservoir to the interior of the flower pot, it is only necessary to rotate the flower pot relative to the reservoir receptacle, about the vertical axis thereof in the necessary direction to cause cam means to effect raising or lowering of the flower pot relative to the reservoir and thereby increase or decrease the capillary action between the bottom of the flower pot and the capillary member in the reservoir. In a normally contemplated size of reservoir, it is possible to furnish a supply of water which is adequate to continuously furnish moisture to a flower pot for a period of two or three weeks, or even longer. All components of the flower pot unit comprising the present invention may be formed inexpensively by molding from synthetic resin or any other suitable material. An attractive unit may be produced for a reasonable selling price. The replenishing of water within the reservoir is effected readily, simply by removing the flower pot therefrom and filling the reservoir to the desired limit either with or without first removing the capillary member therein. All of the components readily are assembled and interfitting of the capillary member with the reservoir receptacle, as well as placing of the flower pot operatively in position within the upper end of the reservoir receptacle readily is effected. Substantially small amounts of adjustment of the flower pot relative to the reservoir may be maintained by positioning means provided on certain opposing cams of the pot and reservoir. As a result, accurate, controlled watering of plants and seeds within the flower pot may take place continuously for a number of days without attention and without replenishing the water supply in the reservoir.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. A self-watering flower pot unit comprising in combination, a water reservoir receptacle, a flower pot positioned adjacent the upper portion of said receptacle and adapted to contain soil-like material in which seeds and plants are to be planted, said flower pot having at least one aperture in the bottom thereof, a capillary member extending upwardly from the lower portion of said reservoir receptacle and the upper end thereof terminating adjacent said aperture in said flower pot and adapted to contain material through which water is conducted by capillary action, said capillary member having water inlet means to permit water from said reservoir receptacle to permeate the material within said capillary member and conduct it to the upper end thereof for engagement with soil-like material within said flower pot, thereby to absorb water from said capillary member and the contents thereof, and means on the upper portion of said reservoir engageable with means on the lower portion of said flower pot and operable to move said flower pot vertically various distances relative to said capillary member upon relative movement of said reservoir and pot, thereby to vary the engagement of the soil-like material in said flower pot with the material in said capillary member and correspondingly vary the amount of water entering said flower pot.

2. The self-watering flower pot unit set forth in claim 1 further characterized by the lower portion of said flower pot and upper portion of said reservoir receptacle being interfitting and at least one of said portions having cam means interengaging the other portion to effect elevation and lowering of said flower pot relative to said reservoir receptacle and capillary member therein upon relative rotation in opposite directions of said flower pot and reservoir receptacle about the vertical axes thereof.

3. The self-watering flower pot unit set forth in claim 2 further characterized by said cam means comprising complementary and gradually sloping cams which respectively effect elevation and lowering of said flower pot when said relative rotation takes place.

4. The self-watering flower pot unit set forth in claim 3 further characterized by positioning means being included with said cam means and operable to hold said interengaging cams disengageably in desired positions of adjustment.

References Cited in the file of this patent

UNITED STATES PATENTS

| | | |
|---|---|---|
| 2,253,469 | Markley | Aug. 19, 1941 |

FOREIGN PATENTS

| | | |
|---|---|---|
| 4,005 | Austria | May 10, 1901 |
| 1,024,483 | France | Jan. 10, 1953 |
| 1,134,981 | France | Dec. 10, 1956 |
| 66,056 | Switzerland | Aug. 11, 1913 |